United States Patent Office 3,060,182
Patented Oct. 23, 1962

3,060,182
CATIONIC SURFACTANTS AND THEIR
PREPARATION
John D. Zech, Wilmington, Del., assignor to Atlas Chemical Industries, Inc., Wilmington, Del., a corporation of Delaware
No Drawing. Filed Apr. 23, 1957, Ser. No. 654,472
10 Claims. (Cl. 260—256.4)

This invention relates to processes for the synthesis of nitrogen compounds derived from polyhydric alcohols having at least three hydroxyl groups per molecule and to products which may be produced by such processes. Particularly, it relates to surface-active condensation products of mono and poly (hydroxy haloalkyl) ethers of polyhydric alcohols and acylated polyamines.

An object of this invention is to provide a novel class of cationic surfactants which contain basic nitrogen atoms and a plurality of hydroxyl groups and further to provide a method of making such compositions.

An additional object of this invention is to provide surfactants which will increase the softness and lubricity of textile yarns, and to provide textiles which are softened and lubricated.

A further object of this invention is to provide a class of compounds which, when used as additives in jet fuels, impart anti-static properties thereto.

The above objects of this invention, as well as additional objects, will be apparent to those skilled in the art from a consideration of the following description.

Briefly summarized, methods of the present invention may involve the following steps:

(1) A polyhydric alcohol containing three or more hydroxyl groups per molecule, preferably a hexitol, is condensed with an epihalohydrin such as, for example, epichlorohydrin.

(2) Separately, a polyalkylene polyamine is reacted with a fatty acid (or its equivalent) and also, if desired, with a short chain aliphatic acid (or its equivalent) under conditions producing carbon to nitrogen bonding. The reactants must be selected in such proportions that the resulting polyamine derivative contains residual basic nitrogen.

(3) The product of step (1) is brought into reaction with the product of step (2) in such proportions that from one to two basic nitrogen equivalents are present for each halogen equivalent, thus forming a cationic surface-active salt which is a hydrohalide or a quaternary halide.

(4) If desired, the surface-active free base may be liberated by treating the salt with an alkali. Thereafter, the free base may be reacted with various organic and inorganic acids including mineral acids such as, for example, phosphoric and sulfuric acid, to form other acid salts which also have surface-active properties.

The initial step of the synthesis is exemplified by the condensation of a polyhydric alcohol having three or more hydroxyl groups per molecule with epichlorohydrin in the presence of a catalyst. The reaction can be represented by the following chemical equation:

(1)

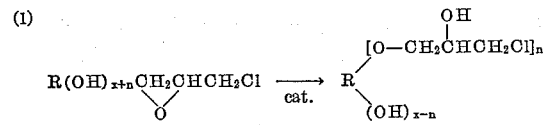

In the above equation $x$ is a number of three or more and $n$ is a number from one to $x$. R is an hydroxyl-free radical of a polyhydric alcohol. When the polyhydric alcohol is a hexitol, from one to about three mols of epichlorohydrin are usually preferred.

The reaction illustrated above may be performed in the presence of an acidic catalyst as is well known in the prior art. Preferred catalysts are those of the Lewis acid type which include, for example, $BF_3$, $BF_3$ etherate, $AlCl_3$, and $SnCl_4$, but $H_2SO_4$, p-toluene sulfonic acid and the like may also be used.

The reaction may be carried out over a wide range of temperature conditions. Below about 50° C. reaction times with higher polyhydric alcohols tend to become unduly long although reactions involving glycerin can be readily performed at that temperature. Above about 130° C. some polyhydric alcohols, for example, hexitols, tend to undergo undesirable decomposition and color formation, but with less sensitive polyhydric alcohols temperatures as high as 175° C. may be used. A preferred temperature range is that between 90° and 130° C.

The reaction may be performed at any convenient pressure. While atmospheric pressure is most convenient, the exact reaction conditions chosen are a function of the reactants used and the desired speed of reaction. Thus, when the reactants are sorbitol (which solidifies at about 90°–95° C.) and epichlorohydrin (which boils at about 117° C.), it is preferred to carry the reaction out at about 100°–110° C. and atmospheric pressure.

While the reaction is generally carried out in the absence of solvent or diluent, such materials may be used if desired to lower the viscosity, as an aid in controlling temperature, or to permit the use of lower temperatures where high melting polyhydric alcohols (such as hexitols) are used.

Suitable polyhydric alcohols or mixtures thereof for use in this connection include, among others, triols (such as glycerol), tetritols (such as erythritol), pentitols (such as xylitol, arabitol, etc.), the hexitols (such as sorbitol, mannitol, dulcitol, etc.), polyhydric alcohols containing more than six hydroxy groups and polyhydric alcohols such as pentaerythritol, trimethylolethane, trimethylolpropane and other polymethylol alkanes.

Suitable polyhydric alcohols also include anhydro derivatives of other polyhydric alcohols (having at least three hydroxy groups per molecule) in which water has been removed from two hydroxyl groups to form a cyclic ether, such as 1,4-sorbitan, and also external ethers of polyhydric alcohols, as, for example, diglycerol.

Another group of suitable polyhydric alcohols comprises the monosaccharides such as sorbose, mannose, glucose, arabinose and xylose as well as methyl glucoside and similar compounds.

The polyhydric alcohols useful in this invention include those, of the type listed above, which have been modified by etherification with alkylene oxides such as ethylene oxide, 1,2-propylene oxide and mixtures thereof. As is well known in the art, such a reaction yields products containing polyoxyalkylene chains of varying length. If a mixture of alkylene oxides is employed, a given polyoxyalkylene chain may contain both the oxyethylene group and the oxypropylene groups. For the purpose of utilization in this invention the most suitable polyoxyalkylene ethers of polyhydric alcohols are those formed by reacting from one to six mols of alkylene oxide with each mol of polyhydric alcohol. The term polyhydric alcohol when used hereafter is intended to include all of the above exemplified compounds and mixtures thereof.

In lieu of epichlorohydrin other epihalohydrins may be used such as epibromohydrin and epiiodohydrin. Other compounds such as 1-chloro-2,3-epoxybutane and 2-chloro-3,4-epoxybutane are also suitable for producing mono and polyhydroxy haloalkyl ethers of polyhydric alcohols. However, fluorine is not usually preferred for use in this connection, and consequently the halogen employed should preferably be one having an atomic weight above 30.

The condensation products of this reaction are, for the most part, very viscous syrups. The are complex mixtures which may contain residual free polyhydric alcohol in addition to various isomeric epihalohydrin-polyhydric alcohol condensates (i.e. chlorhydroxypropyl ethers).

The following are a few specific examples of the initial reaction which are intended to illustrate the process but not to limit it to the specific reactants involved.

EXAMPLE I-1

729 grams of anhydrous sorbitol were heated to a reaction temperature of between 98° and 108° C.; 2.0 cc. of BF$_3$ etherate catalyst (45% BF$_3$) were then added.

Thereafter, 925 grams of epichlorohydrin (molal ratio sorbitol to epichlorohydrin of 1:2.5) were added dropwise, over a period of 1 hour, 10 minutes with vigorous stirring and control of cooling, so as to maintain the temperature within the specified limit. The temperature was subsequently maintained for one hour between 98° and 108° C. by the addition of heat to insure completion of the reaction.

Additional examples are given in Table I. In each case, the procedure followed was similar to the procedure outlined above except as indicated in the table.

*Table I*

| Example No. | Alcohol used | Grams alcohol | Grams epichlorohydrin | Molal ratio alcohol: epi. | Cc. of 45% BF$_3$ etherate | Reaction temp., °C. | Epichlorohydrin addn. time | Total reaction time |
|---|---|---|---|---|---|---|---|---|
| I-1 | Sorbitol | 729 | 925 | 1:2.5 | 2.0 | 98-108 | 1 hr. 10 min. | 2 hrs. 10 min. |
| I-2 | do | 651 | 578 | 1:1.75 | 1.5 | 98-109 | 45 min. | 1 hr. 45 min. |
| I-3 | do | 1,184 | 602 | 1:1 | 3.0 | 97-109 | 38 min. | 1 hr. 38 min. |
| I-4 | do | 1,200 | 1,220 | 1:2 | 3.0 | 100-107 | 2 hrs. 40 min. | 3 hrs. 40 min. |
| I-5 | do | 913 | 1,040 | 1:2.25 | 2.0 | 100-107 | 60 min. | 2 hrs. 0 min. |
| I-6 | do | 913 | 578 | 1:1.25 | 2.0 | 101-109 | 30 min. | 1 hr. 30 min. |
| I-7 | do | 1,184 | 3,160 | 1:5.25 | ¹ 3.4 | 106-115 | 4 hrs. 30 min. | 5 hrs. 30 min. |
| I-8 | Glycerol | 460 | 463 | 1:1 | 1.0 | 80-105 | 40 min. | 1 hr. 40 min. |
| I-9 | do | 460 | 698 | 1:1.5 | 1.25 | 92-107 | 53 min. | 1 hr. 53 min. |

¹ Grams.

The second synthesis step is the carbon to nitrogen bond-forming reaction of a fatty acid (or its equivalent) with a polyalkylene polyamine.

The chemistry of the amidation reaction between polyalkylene polyamines and fatty acid has been well elucidated in the prior art. Under comparatively mild reaction conditions, a carbon to nitrogen bond is created and simple amides of the polyamines consequently are formed. Depending on the proportion of reactants the amides which are formed may be mono-amides, di-amides or higher amides. Under more severe conditions, particularly at high temperatures, some of the first formed amides undergo a ring closing dehydration to form substituted cyclic nitrogen compounds as, for example, substituted imidazolines, and substituted tetrahydropyrimidines.

The reactions involved may be illustrated by the following equations wherein R'COOH represents a fatty acid preferably containing from 12 to 22 carbon atoms per molecule.

(2) Formation of a mono-amide using diethylene triamine:

$$R'-\overset{O}{\overset{\|}{C}}-OH + \underset{H}{\overset{H}{\diagdown}}N-C_2H_4-NH-C_2H_4-N\underset{H}{\overset{H}{\diagup}} \longrightarrow$$

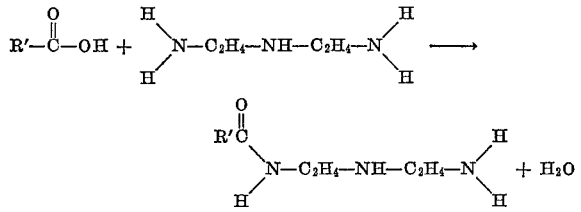

(3) Formation of a di-amide using diethylene triamine:

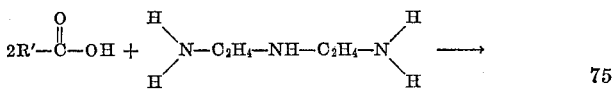

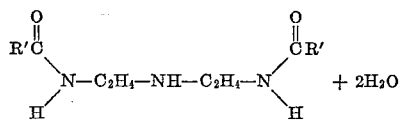

(4) Formation of an imidazoline from the product of Equation 2:

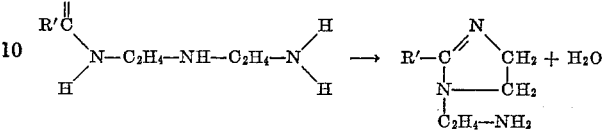

(5) Formation of a mono-amide from a propylene triamine:

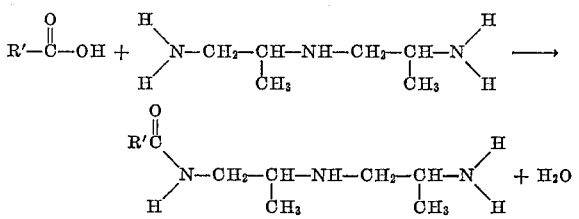

(6) Formation of an imidazoline from the product of Equation 5:

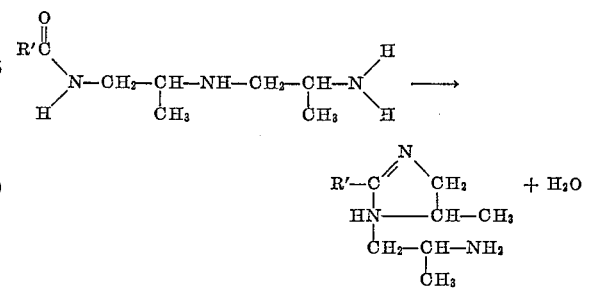

(7) Formation of a mono-amide from 3,3'-iminobispropylamine:

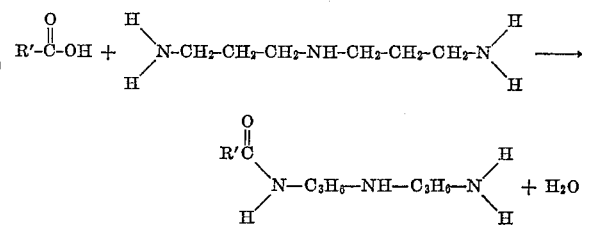

(7-A)

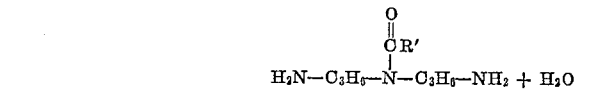

(8) Formation of a substituted tetrahydropyrimidine from the product of Equation 7:

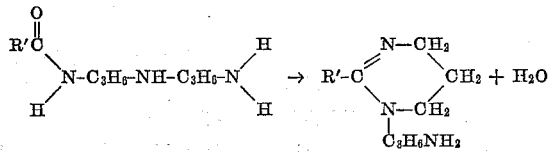

(9) Formation of a substituted imidazoline from the product of Equation 3:

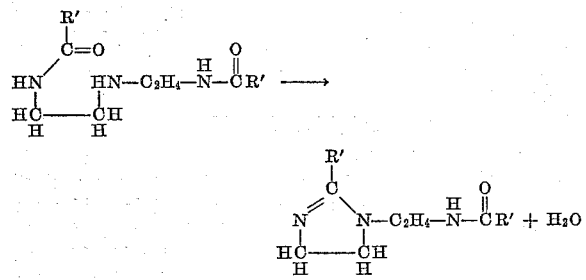

(10) Formation of a mono-amide from N-aminoethyl piperazine:

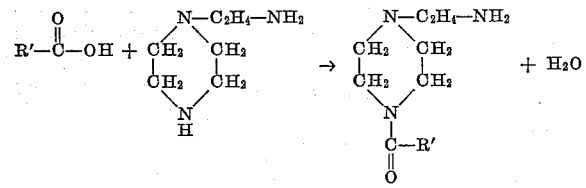

(11) Formation of a diamide from N-aminoethyl piperazine:

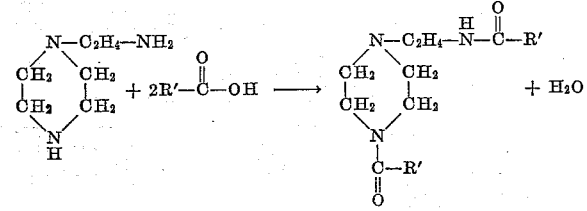

To prepare the intermediates of this step, a fatty acid preferably containing from 12 to 22 carbon atoms, such as for example lauric, tridecanoic, myristic, pentadecanoic, palmitic, margaric, stearic, dodecylenic, palmitoleic, oleic, ricinoleic, linoleic, linolenic, elostearic, licanic, behenic, erucic or a naphthenic acid is brought into reaction with a polyalkylene polyamine. Mixtures of these acids may also be used.

Naturally occuring fats may be used in place of fatty acids. Suitable ones include, for example, tallow, lard, cottonseed oil, soybean oil, corn oil, castor oil, coconut oil and mixtures thereof. Mixtures of higher fatty acids derived from these fats, such as, for example, coconut fatty acids, lard fatty acids and cottonseed fatty acids may also be used. Only aliphatic mono-carboxylic acids derived from petroleum by oxidation are also suitable.

Fatty acid esters, preferably lower alkyl esters, are also suitable reactants. When an ester is employed as the source of fatty acid, the by-product of the reaction is the corresponding alcohol instead of water. It may be removed by a distillation, if desired, or may be left in the reaction mixture as a diluent. All of the above materials are intended to be included within the scope of the term "fatty acid" henceforth.

It is also possible to modify the hydrophilic character of the products of the invention by partially amidating the polyamine with at least one molecule of a long chain fatty acid of the type described above and also amidating other amino nitrogens with a short chain (2 to 6 carbon atoms per molecule) aliphatic acid or its equivalent.

Thus, the product of Equation 2 may be reacted with a derivative of a short chain aliphatic acid (i.e., ethyl acetate) as follows:

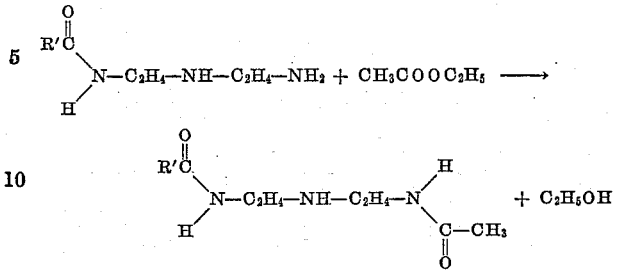

The polyamines with which the above acids or acid equivalents are reacted are preferably polyethylene or polypropylene polyamines, or mixtures thereof, containing from 3 to 5 amino groups. Suitable polyamines include, among others, diethylene triamine, triethylene triamine (N-aminoethyl piperazine), triethylene tetramine, tetraethylene pentamine, hydroxyethyl diethylene triamine (and other reaction products of alkylene oxides such as ethylene and propylene oxide and polyalkylene polyamines, provided however, that the resulting amine contain at least one amino hydrogen), dipropylene triamine, tripropylene tetramine, tetrapropylene pentamine, compounds similar to 3,3'-iminobispropylamine and mixtures of these compounds.

The proportion of reactants used must be such that the number of amine equivalents in the product exceed the equivalents of fatty acid by at least one, thus giving the product basic characteristics. Use of excess amine favors the formation of such basic compounds. For instance, where it is desired to obtain a product having a minimum of fatty acid substitution on the polyamine, such as the mono-amide of diethylene triamine, an excess of polyamine is generally used. The excess amine can be recovered by distillation and re-cycled to the process.

In connection with the basicity of the acylated polyamine it is important to remember that tertiary amino nitrogen atoms are incapable of amidation. Furthermore such tertiary amino nitrogen atoms exhibit basic characteristics. Therefore, even if a polyamine which contains tertiary amino nitrogen is fully amidated it still has basic properties after amidation because the tertiary amino nitrogen has not been converted to an amido nitrogen. Tertiary nitrogen atoms thus remain basic throughout the reaction and are counted as part of the excess amine equivalents in selecting the reactant proportions.

In the subsequent formation of the surfactants of this invention either the open chain amide type of derivative or the cyclized type, as exemplified by the substituted imidazolines and substituted tetrahydropyrimidines may be used. Mixtures of the two types of derivatives may also be used. In the employment of the novel compositions of the invention it usually is not of moment whether the amide or the cyclic type of configuration is present in the molecule.

When it is desired that the open chain amide structure be predominant, the reaction is carried out at relatively low temperatures, usually from about 125° to 180° C. and for short times, of about ½ to 4 hours. Higher temperatures and/or longer times favor conversion to the imidazoline type products. Reaction temperatures up to 275° C. and times up to 10 or more hours may be utilized.

Examples II–1 to II–11 illustrate the preparation of fatty acid-polyamine derivatives suitable for use in producing the compositions of the invention.

EXAMPLE II–1

103 grams (one molar proportion) of diethylene triamine and 568 grams (two molar proportions) of a commercial stearic acid were charged into a reaction flask and heated for one hour at a temperature of from 160° to 170° C.

During the course of the reaction 40 ml. of distillate were removed from the flask. The product contained 6.4% nitrogen and had, as determined by titration, an HCl equivalent of 586. The predominant component was the di-stearic acid amide of diethylene triamine.

EXAMPLE II-2

128 grams (1.25 mols) of diethylene triamine and 731 grams of tallow (2.5 acid equivalents) were heated together for 4 hours in the temperature range of 138° to 174° C. after which 26 grams of vacuum distillate were removed by vacuum stripping at 1 mm. The contents of the flask solidified at room temperature to a waxy solid consisting principally of the tallow acid di-amide of diethylene triamine. A small proportion of glycerol liberated from the fat used as a source of fatty acid remained with the product. The overall nitrogen content was 5.91% and the HCl equivalent was 704.

EXAMPLE II-3

256 grams of diethylene triamine and 1646 grams of tallow were heated together at 150° to 175° C. for 3 hours and 40 minutes. During the heating which was conducted under a vacuum, 57 grams of distillate were collected. The residue in the flask comprised the tallow acid amides of diethylene triamine. The nitrogen content of the mixture was 5.5% and the HCl equivalent was 780.

EXAMPLE II-4

The preparation of Example II-3 was repeated except that only 1280 grams of tallow were employed and the heating time was 3 hours and 30 minutes. The nitrogen content of the resulting product was 6.86% and its HCl equivalent was 544. The product contained a mixture of tallow acid mono- and di-amides of diethylene triamine.

EXAMPLE II-5

The preparation of Example II-3 was repeated except that 1462 grams of tallow were employed. The product, comprising principally the tallow acid di-amide of diethylene triamine had a nitrogen content of 5.97% and an HCl equivalent of 712.

EXAMPLE II-6

A considerable excess (1900 ml.) of diethylene triamine and 1700 grams of oleic acid were heated together for 4¾ hours while the temperature rose from 160° to 255° C. Excess diethylene triamine was stripped off after which 1453 grams of 1-aminoethyl 2-heptadecenyl imidazoline was vacuum distilled off at 1 mm. pressure leaving in the reaction vessel 543 grams of product comprising a major proportion of the oleic acid amide of 1-aminoethyl, 2-heptadecenyl imidazoline. The nitrogen content of the residue remaining in the reaction flask was 7.87% and the HCl equivalent was 466.

EXAMPLE II-7

350 grams of lard and an excess (600 grams) of triethylene tetramine were heated together for 5 hours while the temperature rose from 191° to 262° C. The reaction product was then stripped under vacuum to 249° C. at 1 mm. pressure. The resulting product contained a mixture of 1-(aminoethyl iminoethyl), 2-alkyl imidazoline and the lard acid's amide thereof, and related compounds, where an alkyl stands for the mixed carboxyl-free radical of lard acids. The nitrogen content was 12.2% and the HCl equivalent was 191.

EXAMPLE II-8

376 grams of diethylene triamine and 300 grams of coconut oil were heated together for 4 hours and the temperature held at from 179° to 256° C. The product was vacuum stripped to 162° C. at 1 mm. pressure yielding a mixture of 1-aminoethyl, 2-alkyl imidazoline and the coconut fatty acid amide thereof, alkyl representing the mixed carboxyl-free residues of the coconut fatty acid. The nitrogen content of the composition was 13.9% and its HCl equivalent was 162.

EXAMPLE II-9

400 grams of commercial stearic acid (Wilmar's 501 acid) and 700 grams of tetraethylene pentamine were heated together for 5¾ hours while the temperature was raised to the range from 180° to 261° C. The reaction mixture was stripped to a temperature of 233° C. at a pressure of 0.5 mm. to yield a product having a nitrogen content of 15.3% and an HCl equivalent of 146.

EXAMPLE II-10

201 grams of N-hydroxyethyl diethylene triamine (made by reacting one mol of ethylene oxide with one mol of diethylene triamine) and 386 grams of oleic acid were heated together for 1 hour and 50 minutes at 150° to 170° C. The product was then reacted with 310 cc. of ethyl acetate at 87° C. to further amidate it with the equivalent of a short chain aliphatic acid. Unreacted ethyl acetate and formed volatile by-products of the reaction were removed by distillation leaving a product consisting essentially of the acetic amide of the oleic acid mono amide of N-hydroxyethyl diethylene triamine. Its nitrogen content was 8.89% and its HCl equivalent was 411. This reaction can also be performed using acetic acid instead of ethyl acetate.

EXAMPLE II-11

2,750 grams of inedible tallow and 481 grams of diethylene triamine were heated together at 150° C. for 3 hours under a nitrogen atmosphere. The product, amounting to 3215 g., was a tan colored waxy material with a Gardner color of 10, an HCl equivalent of 653, and a nitrogen content of 5.93%.

The third step in the synthesis of the hydroxyl-bearing cationic surfactants of the present invention is the reaction of the polyol-epihalohydrin ethers of step (1) with the fatty acid-polyalkylene polyamine derivatives of step (2) to form salts.

The products are cationic in nature and may be characterized as salts of secondary amines, tertiary amines and quaternary ammonium bases. When the polyamine-fatty acid derivative has basic characteristics due only to a tertiary amino nitrogen atom then the salts formed in this reaction will be quaternary ammonium salts. In any event all the products formed in this synthesis step contain pentavalent nitrogen. In the case of the quaternary salts, four of the valence bonds of the nitrogen are satisfied by carbon whereas in the case of the secondary and tertiary amine salts respectively, only two and three of the bonds are so satisfied.

The reactant proportions are preferably so selected that from 1 to 3, and more preferably from 1 to 2, base equivalents of the fatty acid-polyalkylene polyamine derivatives are condensed per halogen atom of the polyol-epihalohydrin ether. The reaction may be carried out at any temperature from about 75° to 150° C., the preferred range being from 100° to 130° C. The following equations, in which the symbols have the same meaning as above, are ilustrative of the type of salts which may be formed from the several types of intermediates hereinbefore described.

(12) Reaction involving an amino-amide and a hexitol-epichlorohydrin derivative:

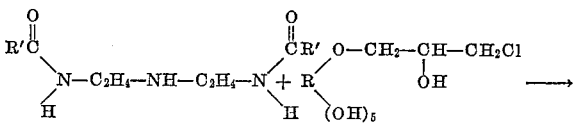

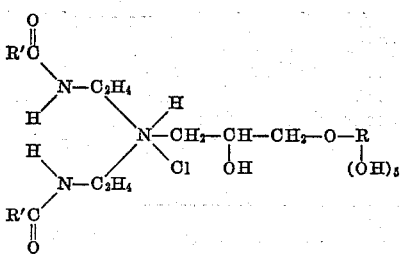

(13) Reaction involving an amino-substituted imidazoline and a hexitol-epihalohydrin derivative:

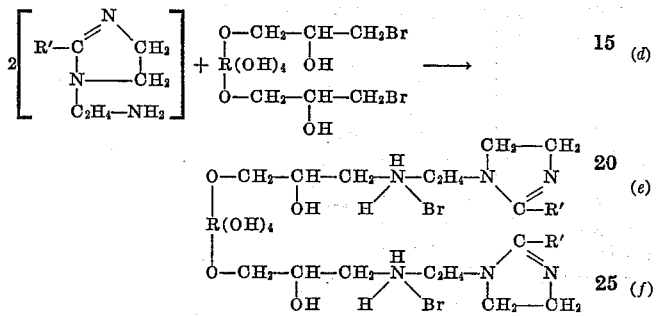

(14) Reaction involving product of Equation 8 and a hexitol-epichlorohydrin derivative:

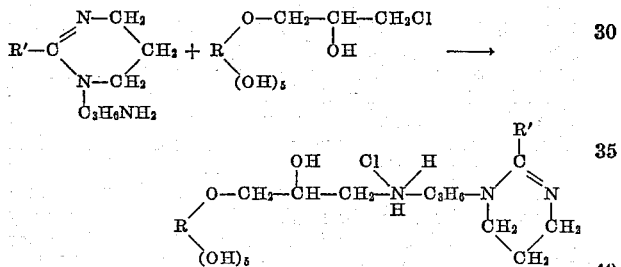

(15) Reaction of product of Equation 9, which contains tertiary amino nitrogen, and a triol-epichlorohydrin derivative to form a quaternary ammonium salt:

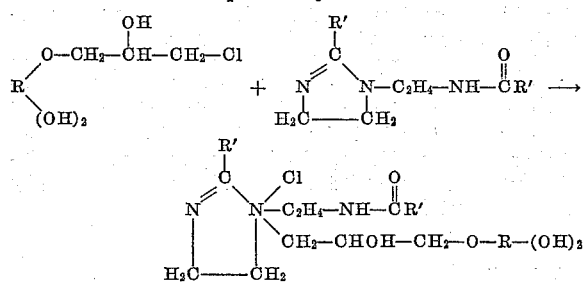

These salts may be converted to free bases (including quaternary hydroxides) by treatment with an alkali such as NaOH in a known manner.

Some of the wide variety of compounds which can be prepared in this manner may be illustrated by the following formula:

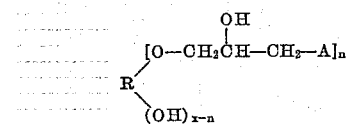

wherein $x$ is a number from 3 to 6; $n$ is a number from 1 to $x$; R is a hydroxyl free radical of a polyhydric alcohol; and each A is a monovalent organic radical independently selected from the group exemplified by the following:

(a) 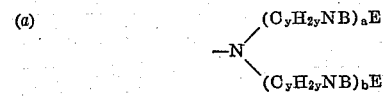

and substituted imidazoline and tetrahydropyrimidine derivatives of (a) such as, for example:

(b) 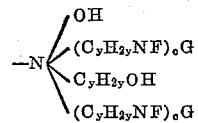

(c)

(d)

(e)

(f)

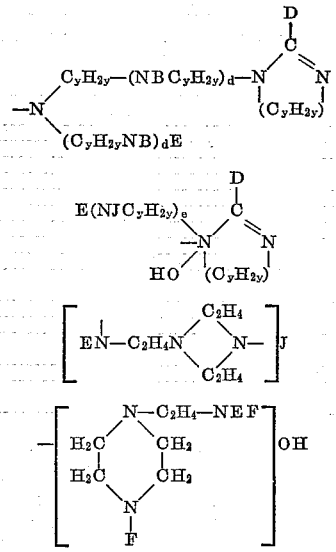

Wherever used in the above radicals:

$a$ and $b$ are integers (either of which may be zero) whose total is a whole number from 2 to 4;

Each $c$ is an integer from zero to 4 whose total value in a given radical is a number between 2 and 4;

Each $d$ is an integer from zero to 2 provided that their total in a given radical does not exceed 2;

$e$ is an integer from 1 to 3;

$y$ is either 2 or 3;

Each B is independently selected from the group consisting of hydrogen, hydroxy lower alkyl, acyl radicals of fatty acid containing from 12 to 22 carbon atoms and acyl radicals of aliphatic acids containing from 2 to 6 carbon atoms;

D is the hydrocarbon radical of an acyl variant of B;

Each E is independently selected from the group consisting of hydrogen and hydroxyl lower alkyl;

Each F is independently selected from the group consisting of hydroxy lower alkyl, acyl radicals of fatty acids containing from 12 to 22 carbon atoms and acyl radicals of aliphatic acids containing from 2 to 6 carbon atoms;

Each G is independently selected from the group consisting of hydroxy lower alkyl and amino hydrogen; and Each J is independently selected from the group consisting of acyl radicals of fatty acids containing from 12 to 22 carbon atoms and acyl radicals of aliphatic acids containing from 2 to 6 carbon atoms;

Provided finally that in a given radical at least one of B, D, F, or J must be long chain acyl.

After compounds of the above type have been synthesized, they may be reacted if desired with water-soluble, amine-salt-forming acids. It is thus possible to form nitrates, sulfates, alkyl sulfates and phosphates as well as organic acid salts such as formates, acetates, lactates, tartrates, benzene or toluene sulfonates and citrates.

The following examples shown in detail the preparation of cationic surface-active agents in accordance with the invention. The examples are illustrative but are not to be considered as limiting the invention.

EXAMPLE III-1

318 grams of the product of Example II-1 and 92 grams of the product of Example I-8 were heated together for 1½ hours in the temperature range of 90 to 126° C. The resulting condensate was a soft water-dispersible wax with marked surface active properties. Additional examples are presented in Table II which indicated the amounts of reactants, reaction conditions and nature of the resulting products.

After the evaluation was complete, the staple fiber was placed in an oven and kept at 120° C. for 16 hours to determine if heat had any effect on the color. An asterisk next to a value in Table III indicates that discoloration occurred on heating.

To determine lubricity, rayon skeins were treated with

*Table II*

| Ex. No. | F.A.-polyamine— weight-grams from Ex. No. | Polyol-epichlor.— weight-grams from Ex. No. | Reaction time, hrs. | Reaction temp., ° C. | Nature of product |
|---|---|---|---|---|---|
| III-2 | 200, II-2 | 56, I-2 | 2 | 77-125 | Soft, water-soluble wax. |
| III-3 | 300, II-3 | 63, I-5 | 2 | 90-125 | Soft, water-dispersible wax. |
| III-4 | 316, II-3 | 92, I-6 | 2 | 90-126 | Do. |
| III-5 | 300, II-4 | 125, I-6 | 2 | 100-130 | Do. |
| III-6 | 300, II-4 | 91, I-5 | 2 | 78-132 | Do. |
| III-7 | 186, II-2 | 45.5, I-5 | 2¼ | 100-131 | Do. |
| III-8 | 300, II-5 | 95, I-6 | 2¼ | 77-126 | Do. |
| III-9 | 300, II-5 | 69, I-5 | 2¼ | 68-132 | Do. |
| III-10 | 233, II-6 | 92, I-4 | 2 | 99-117 | Do. |
| III-11 | 193, II-7 | 278, I-3 | 1½ | 87-136 | Waxy water-soluble solid, dispersible in alkali. |
| III-12 | 174, II-8 | 256, I-6 | 1½ | 84-128 | Do. |
| III-13 | 174, II-9 | 213, I-6 | 1¼ | 89-122 | Do. |
| III-14 | 231, II-10 | 111, I-2 | 3½ | 82-110 | Soft water dispersible wax, dispersible in alkali. |
| III-15 | 210, II-10 | 166, I-1 | 2¾ | 100-117 | Do. |
| III-16 | 430, II-11 | 121, I-8 | 6 | 115-122 | Soft, brown water dispersible wax. |
| III-17 | 430, II-11 | 103, I-9 | 6 | 116-118 | Soft, brown readily water dispersible wax. |

Compounds of this invention also have utility as textile softeners and lubricants. When used as a softener, they give a soft, pleasing feel to fabrics which would otherwise tend to feel stiff and harsh. When used as a lubricant, during textile processing, they reduce friction between moving yarn and metal machine parts over which it moves. Cationic amides of the invention are generally preferred for this use.

A series of tests were made to demonstrate the effectiveness of these compounds as textile treating agents. In each case, the procedure followed was the same.

Five gram batches of ten different staple fibers, including cotton, nylon, Vicara*, Acrilan*, Orlon*, Dacron*, acetate, Dynel*, rayon, and Darlan*, were each immersed in 300 cc. of a 0.5% aqueous solution of the treating agent to be tested. The temperature of the solution was 50° C. After three minutes, the staple fiber was centrifuged for thirty seconds, allowed to dry and then carded. Samples were evaluated by a panel.

A rating scale of 1 to 5 was used. To establish a basis of comparison for the evaluation, a sample of each staple was treated with cetyl ethyl morpholinium ethosulfate in the manner indicated above and each of these samples was given an arbitrary rating of 2 on the above scale. An additional sample of each staple was then treated in the above manner with an alkyl biguanidine and a rating of 4 was assigned to these samples. The panel's evaluation of the effect of compounds of the invention upon samples of the staple fibers are given in Table III.

*Indicates a trademarked product. For manufacturer and nature of these fibers, see standard reference works such as "The Condensed Chemical Dictionary," 5th ed., Reinhold 1956.

300 cc. of 0.5% aqueous solution of the various agents at 50° C. The rayon skeins were then centrifuged for 30 seconds, air dried and finally stored at a constant temperature and 50% relative humidity for 16 hours to allow them to reach equilibrium moisture conditions. At the end of that time, and under the same controlled temperature and humidity, friction measurements were made. Yarn to metal friction was measured at a yarn speed of 10 meters per minute and yarn to yarn friction was measured at 1 centimeter per minute. Lubricity measurements are also recorded in Table III. Whereas ordinary rayon to metal tension without lubricants is on the order of 125 grams, the tensions after treatment were all below 70 grams.

When the product is used as a lubricant, it may be removed by scouring after the conclusion of textile processing. If it is used as a softener, it will be removed gradually in the course of several launderings.

The treating compound is usually applied in an aqueous dispersion. It may be applied in several ways, including the use of a dipping roll, by immersion of the material to be treated in a bath, by use of a padder and in other similar manners. The application may come at the beginning or end of the textile process and is often followed by a drying operation.

*Table III*

TEXTILE TREATMENT

| Ex. No. | Product of Ex. No. | Relative staple softness | | | | | | | | | | Friction grams | |
|---|---|---|---|---|---|---|---|---|---|---|---|---|---|
| | | Nylon | Vicara | Acrilan | Orlon | Dacron | Acetate | Dynel | Rayon | Darlan | Cotton | Avg. | Yarn to yarn | Yarn to metal |
| IV-1 | III-2 | 3.00 | 4.25 | 3.75 | 4.00 | 3.50 | 2.25 | 3.00 | 4.50 | 4.00 | 4.00 | 3.63 | 8±1 | 63 |
| IV-2 | III-3 | 3.00 | 3.25 | 3.25 | 4.25 | 3.50 | 4.50 | 3.75 | 4.50 | 3.50 | 4.25 | 3.78 | 28±1, erratic | 65 |
| IV-3 | III-4 | 4.25 | 4.25 | 2.50 | 4.00 | 3.00 | 4.75 | 3.75 | 4.50 | 3.75 | 4.00 | 3.88 | 7±1 | 63 |
| IV-4 | III-5 | 4.00 | 4.00 | 2.50 | 3.75 | 1.75 | 2.50 | 3.50 | 4.00 | 2.75 | 3.00 | 3.18 | 18 stickslip | 57 |
| IV-5 | III-6 | 3.00 | 4.00 | ¹2.75 | 3.25 | 4.25 | 2.75 | 4.25 | 4.25 | 2.75 | 3.00 | 3.43 | 20±2 | 54 |
| IV-6 | III-7 | 4.00 | 4.75 | 4.50 | 4.75 | 4.00 | 3.50 | 3.50 | 4.75 | 5.00 | 4.75 | 4.35 | 9±1 | 68 |
| IV-7 | III-8 | ¹3.50 | 4.00 | 3.00 | 3.50 | 3.50 | 4.75 | ¹3.25 | 3.75 | 3.50 | 3.75 | 3.65 | 9±1 | 63 |
| IV-8 | III-9 | ¹3.25 | 4.00 | ¹2.75 | 4.75 | 3.00 | 4.75 | 3.75 | 5.00 | 4.25 | 4.50 | 4.00 | 18±1 | 65 |

¹ Discoloration occurred in heating.

Compositions of this invention find additional utility as anti-static additives to hydrocarbon fuels of the low vapor pressure wide cut gasoline type. Fuels of this type may usually be characterized as having a Reid vapor pressure within the range of about 2.0 to 3.0. Handling them has, in the past, presented a considerable explosion hazard because their vapor pressure at ambient temperatures is high enough that when a body of fuel is maintained in an ordinary vented tank the amount of vapor is sufficient to provide an explosive mixture but insufficient to lower the proportion of air to such a degree that the mixture above the fuel is not explosive. Consequently fuels of this sort have been susceptible to ignition by sparks such as can be generated by static electriity build sparks such as can be generated by static electricity build up in the fuel body.

It has been found that compounds of this invention have the property of lowering the electrical resistivity of the fuels and/or inhibiting the buildup of static electricity in them. In this way the explosion hazard is greatly minimized when added to such fuel in small quantities of about 0.2% and less. Preferred compositions of the invention for this purpose are those which are soluble in the fuel without haze at concentrations up to 0.2% by weight at temperatures as low as −60° F. The amount of composition of the invention added for anti-static use should be sufficient to reduce the electrical resistivity of the fuel to a value below about $1 \times 10^{10}$ ohm-centimeters. Usually that amount will be between about 0.2% and 0.0025%.

A fuel which is particularly susceptible to this static electrical explosive hazard and in which the compositions of the present invention are particularly useful as anti-static additives is that used for jet engines and referred to as JP-4 fuel. It is completely described in military specification MIL-F-5624C.

In Table IV, are listed a number of examples of additive content of jet fuels containing compounds of the invention. Each of these fuels was prepared by simply adding the amount of additive listed in the table to JP-4 fuel. Each of the resulting fuels had a specific resistivity below $10^{10}$ ohm-centimeters and was useful as a fuel in jet engines. Tests performed on each fuel indicated that it could be handled without buildup of static electricity and that no precipitate haze appeared in the fuel when it was cooled to a temperature of −60° F.

*Table IV*

| Additive: | Concentration (wt. percent of fuel) |
|---|---|
| Product of Example III-2 | .05 |
| Product of Example III-9 | .05 |
| Product of Example III-10 | .05 |

Compositions of this invention also are useful as emulsifiers, detergents, additives for lubricating oils and corrosion inhibitors.

Many changes in processing details may be made without departing from the principles set forth herein and the invention is to be broadly construed in accordance with the following claims.

What is claimed is:

1. A process which comprises reacting at a temperature from about 75° to 150° C. a reactant (1) of the formula:

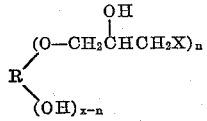

wherein:
R is a hydroxyl-free radical of a polyhydric alcohol,
X is a halogen atom having an atomic weight greater than 30, $x$ is a number from 3 to 6, and $n$ is a number from 1 to $x$, with a second reactant (2) a basic amino nitrogen-containing compound, which is a fatty carboxylic acylation product of a polyalkylene polyamine which polyamine has from 3 to 5 amino groups.

2. The process of claim 1 in which reactant (2) is an open chain fatty carboxylic acid amide.

3. The process of claim 1 in which reactant (2) is a cyclic nitrogen compound selected from the group consisting of imidazolines and tetrahydropyrimidines.

4. The process of claim 1 in which the reaction product resulting from contacting reactants (1) and (2) is thereafter converted to a free base by contacting it with an inorganic alkali.

5. The process of claim 4 which includes the further step of adding a water-soluble, amine-salt forming acid selected from the group consisting of nitric acid, sulfuric acid, phosphoric acid, acetic acid, lactic acid, tartaric acid, stearic acid, benzene sulfonic acid, toluene sulfonic acid and hydrochloric acid, to the free base product of claim 4.

6. The process of claim 1 in which reactant (1) is a sorbitol-epichlorohydrin condensate and reactant (2) is a tallow amide of diethylene triamine.

7. The reaction product made by the process of claim 1.
8. The reaction product made by the process of claim 4.
9. The reaction product made by the process of claim 5.
10. The reaction product made by the process of claim 6.

References Cited in the file of this patent

UNITED STATES PATENTS

| 2,163,720 | Vaughn | June 27, 1939 |
| 2,243,980 | Rheiner et al. | June 3, 1941 |
| 2,245,260 | Dickey et al. | June 10, 1941 |
| 2,347,562 | Johnston | Apr. 25, 1944 |
| 2,413,612 | Eckey et al. | Dec. 31, 1946 |
| 2,525,771 | Cook et al. | Oct. 17, 1950 |
| 2,538,072 | Zech | Jan. 16, 1951 |
| 2,576,306 | Morey | Nov. 27, 1951 |
| 2,581,464 | Zech | Jan. 8, 1952 |
| 2,585,972 | Stacey et al. | Feb. 19, 1952 |
| 2,598,213 | Blair | May 27, 1952 |
| 2,687,415 | Goldberg | Aug. 24, 1954 |
| 2,812,333 | Steele | Nov. 5, 1957 |

OTHER REFERENCES

Hackh's Chemical Dictionary, p. 18, third edition (1944).

Wertheim: Textbook of Organic Chemistry, p. 408, second edition (1945).

Whitmore: Organic Chemistry, pp. 616–617, second edition (1951).

UNITED STATES PATENT OFFICE
CERTIFICATE OF CORRECTION

Patent No. 3,060,182            October 23, 1962

John D. Zech

It is hereby certified that error appears in the above numbered patent requiring correction and that the said Letters Patent should read as corrected below.

Column 3, line 2, for "The" read -- They --; column 5, li 59, for "Only aliphatic" read -- Aliphatic --; column 13, line 6, strike out "sparks such as can be generated by static electriity build".

Signed and sealed this 19th day of November 1963.

(SEAL)
Attest:

ERNEST W. SWIDER

Attesting Officer

EDWIN L. REYNOLDS

Acting Commissioner of Patents